United States Patent [19]

Müller-Odenwald

[11] Patent Number: 4,612,024
[45] Date of Patent: Sep. 16, 1986

[54] METHOD AND APPARATUS FOR REHEATING OF CLEANED GASES SUBSEQUENT TO WET CLEANING OF RAW GASES

[75] Inventor: Hermann E. Müller-Odenwald, Mannheim, Fed. Rep. of Germany

[73] Assignee: SRM Svenska Rotor Maskiner Aktiebolag, Stockholm, Sweden

[21] Appl. No.: 744,045

[22] PCT Filed: Nov. 10, 1984

[86] PCT No.: PCT/EP84/00355
§ 371 Date: Jun. 7, 1985
§ 102(e) Date: Jun. 7, 1985

[87] PCT Pub. No.: WO85/02129
PCT Pub. Date: May 23, 1985

[30] Foreign Application Priority Data

Nov. 12, 1983 [DE] Fed. Rep. of Germany ....... 3341021

[51] Int. Cl.$^4$ ............................................. B01D 53/14
[52] U.S. Cl. .......................................... 55/80; 55/84; 55/73; 55/222; 55/268; 165/7; 165/8
[58] Field of Search ................. 55/23, 73, 84, 80, 268, 55/222; 165/7, 8, 108; 423/242 R

[56] References Cited

U.S. PATENT DOCUMENTS

| | | | |
|---|---|---|---|
| 2,769,619 | 11/1956 | Juhasz | 165/7 |
| 2,899,179 | 8/1959 | Haussler | 165/7 |
| 4,078,390 | 3/1978 | Duvall | 55/73 X |
| 4,187,885 | 2/1980 | Shibuya et al. | 55/80 X |
| 4,446,911 | 5/1984 | Reidick et al. | 165/7 |

FOREIGN PATENT DOCUMENTS

| | | |
|---|---|---|
| 2900275 | 7/1980 | Fed. Rep. of Germany . |
| 0699871 | 11/1953 | United Kingdom ................... 165/7 |

Primary Examiner—Charles Hart
Attorney, Agent, or Firm—Frishauf, Holtz, Goodman & Woodward

[57] ABSTRACT

Method and apparatus for reheating of cleaned gases subsequent to wet cleaning of raw gases.

Cooled cleaned gases of high humidity which have been subjected to a wet cleaning process are reheated by means of regenerative heat exchange with as yet uncleaned, hotter raw gases, a previously already heated partial flow of cleaned gas being added to the cleaned gas flow prior to the performance of the regenerative heat exchanger. The partial flow of cleaned gas is diverted from the previously wet-cleaned total flow of cleaned gas, prior to the regenerative reheating of the cleaned gases by means of heat energy withdrawn from the raw gases, is increased in pressure, and is heated, separately from the main flow of the cleaned gases, in a regenerative heat exchange with the raw gases.

5 Claims, 3 Drawing Figures

METHOD AND APPARATUS FOR REHEATING OF CLEANED GASES SUBSEQUENT TO WET CLEANING OF RAW GASES

BACKGROUND OF THE INVENTION

The invention relates to a method for reheating cleaned gases subsequent to wet-process cleaning of raw gases by means of a regenerative heat exchange between the raw gases and the cleaned gases, in which a previously reheated partial flow of cleaned gas is added to the flow of cleaned gas before the regenerative heat exchange is performed.

In the desulfurization of combustion gases of combustion systems in a wet-washing cleaner, it is known to reheat the washed clean gases to higher temperatures in a rotating regenerative heat exchanger counter to the incoming hot raw gases, in order to bring them to the temperature required for their rise in the exhaust flue. In the gypsum method, the disadvantage arises that droplets of the washing medium are carried away with the moist, saturated cleaned gases emerging from the wet washing process, causing gypsum contained in the washing medium to be carried into the regenerative heat exchanger; the gypsum precipitates onto the heat exchanging surfaces of the heat exchanger in the form of a coating that can be dissolved only with difficulty. It has accordingly already been proposed that the washed clean gases be predried, before they enter the gas heat exchanger, by means of adding a partial flow of raw gases without supplying external energy. Thus the water content of the droplets evaporates, and the gypsum dust, now dried, can easily be removed from the heat exchanging surfaces using known agents. However, because of the admixture of raw gas, sulfur is reintroduced into the cleaned gases, which lowers the degree of desulfurization attained. This disadvantage is avoided by means of a modification (German Patent Disclosure Document DE-OS No. 32 25 716) of this known method such that, instead of the partial flow of raw gas, a partial flow of the cleaned gases already reheated in the heat exchanger is diverted and recirculated, by means of a pressure-increasing blower, into the cleaned gases supplied to the heat exchanger by the wet washer. The quantity of recirculated cleaned gas is regulated here in accordance with the difference in temperature between the cleaned gases at the outlet of the gas washer and the gases prior to the entry into the gas heat exchanger, after the recirculated partial flow has been added.

Another solution is also known (German Patent Disclosure Document DE-OS No. 29 00 275), in which a partial flow is diverted from the total flow of cleaned gases, heated in a rotating regenerative heat exchanger by means of the total flow of raw gases before their entry into the wet washer, and reintroduced into the main flow of cleaned gases before the partial flow of the cleaned gases is removed. Because of the preceding indirect heat exchange between the recirculated partial flow of cleaned gas and the total flow of raw gases, the raw gases are delivered to the wet cleaner having been cooled by the transfer of heat to the partial flow of cleaned gas. The highly heated partial flow of cleaned gas then exchanges heat, in a gas mixer, with the total flow of cleaned gases directly leaving the washer and heats this total flow to such an extent that the cleaned gases enter the exhaust flue at the temperature required to make them rise in it.

Although in the last two known methods described above no raw gases are admixed with the cleaned gases, a certain—albeit limited—quantity of raw gas is introduced into the cleaned gas side of the heat exchanger as a consequence of the use of rotating regenerative heat exchangers, so that small quantities of sulfur are still contained in the cleaned gases emerging from the gas heat exchanger.

SUMMARY OF THE INVENTION

It is accordingly the object of the invention, using a regenerative heat exchanger between the raw and the cleaned gases for reheating of the cleaned gases following the wet cleaning of the raw gases, to perform a predrying of the cleaned gases before they enter the regenerative heat exchanger and thereby to improve the overall degree of desulfurization further.

Based on a method of the type initially described above, this object is attained in accordance with the invention in that prior to the regenerative reheating of the cleaned gases by means of heat energy withdrawn from the raw gases, the partial flow of cleaned gas is diverted from the previously wet-washed total flow of cleaned gas, increased in pressure, and heated separately from the main flow of the cleaned gases in the course of the regenerative heat exchange with the raw gases. In this method, the partial flow of cleaned gas, which is at a higher pressure than the raw gas flow, can be used as a blocking gas between the raw gases and the main flow of cleaned gases, and the introduction of raw gases into the main flow of cleaned gases can thereby be prevented.

In a preferred embodiment of the invention, the partial flow of cleaned gas which is heated by a separate regenerative heat exchange is recirculated into the main flow of cleaned gases prior to its diversion, viewed in the direction of flow of the cleaned gases. Thus the partial flow of cleaned gas serves both to prevent the introduction of raw gases into the main flow of cleaned gas, that is, acting as a blocking gas flow, and to reheat the cool cleaned gases emerging from the wet-wash cleaner.

It is recommended that the pressure of the parfial flow diverted from the main flow of the cleaned gases be regulated in accordance with the pressure of the raw gases before their regenerative heat exchange with the cleaned gases, in order to maintain the effectiveness of the blocking gas flow even in the event of fluctuations in the pressure of the raw gas flow.

The apparatus for performing the method according to the invention, which operates with a rotating regenerative heat exchanger through which the raw gases flow from one side and the cleaned gases emerging from the wet cleaner flow from the other, is characterized in that in the regenerative heat exchanger, in addition to the raw gas duct and the cleaned gas duct, a third separate flow-through duct is provided for the cleaned gas partial flow, and that the flow-through duct for the partial flow of cleaned gas is disposed following the raw gas duct and prior to the cleaned gas duct, as viewed in the direction of rotation of the regenerative heat exchanger.

In an advantageous embodiment of the apparatus according to the invention, a connection is provided on the hot side of the rotating regenerative heat exchanger, between the flow-through duct for the partial flow of cleaned gas and the raw gas duct, for the recirculation of raw gases introduced from the raw gas duct into the flow-through duct for the partial flow of cleaned gas. This connection may be preceded by a catch-hood, which covers the sector at the transition from the combustion gas duct into the cleaned gas duct, or else a corresponding enlargement of the sealing sector is provided. In this manner, raw gases introduced into the cleaned gas sector from the raw gas sector in the form of a chamber charge are positively displaced back into the raw gas duct by means of a corresponding portion of the cleaned gas partial flow.

In order to adjust the proportion of the cleaned gas partial flow that is used to positively displace the introduced gases to the quantity required at a given time, it is furthermore advantageous to dispose control elements in the connection between the ducts for the raw gases and for the partial flow of cleaned gases.

It is further advantageous to provide a pressure-increasing blower with a controllable drive in the line carrying the partial flow of cleaned gas to the cold side of the rotating regenerative heat exchanger, the blower being controllable in accordance with the pressure of the raw gases entering the rotating regenerative heat exchanger.

BRIEF DESCRIPTION OF THE DRAWINGS

The invention will be described in further detail in the ensuing description of an exemplary embodiment of the apparatus according to the invention, taken in conjunction with the drawing.

DETAILED DESCRIPTION OF THE PREFERRED EMBODIMENTS

Figure 1:
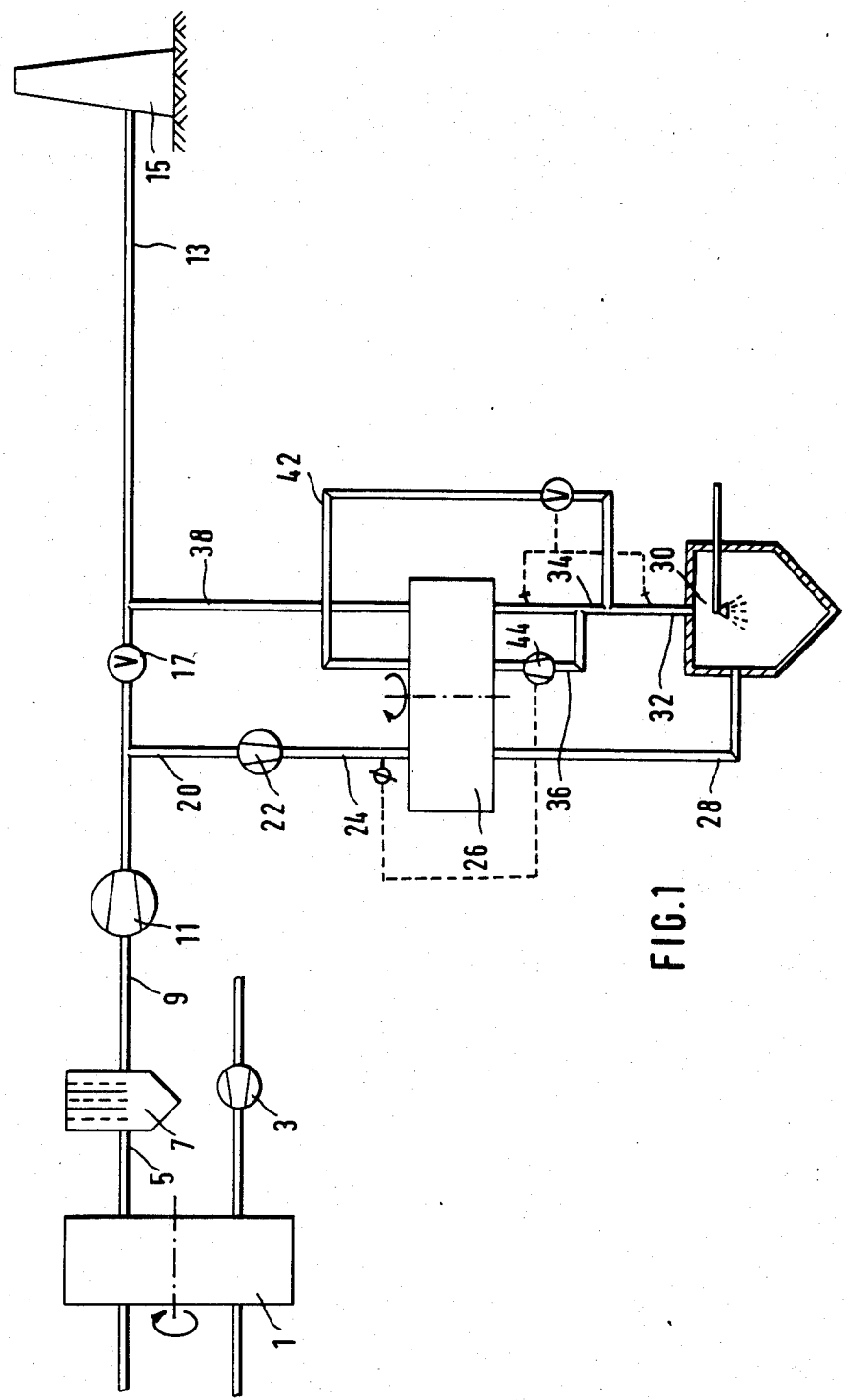
FIG. 1 schematically shows the structure of an apparatus in accordance with the invention for reheating the cleaned gases subsequent to the wet cleaning of raw gases emerging from a combustion system.

The raw gases leaving a vessel, not shown, of a combustion system are cooled in a vessel-type air preheater 1 by means of combustion air supplied in counterflow via a blower 3 to the vessel-type air preheater in order to heat this preheater. Subsequently the cooled raw gases are delivered via a line 5 to filters 7 in order to remove solid materials carried along with them. The raw gases are carried via a line 9 and an induced draft blower 11 as well as a connecting line 13 into the smokestack, or flue, 15.

Branching off from the line 13, which is closable by means of a control element 17, is a line 20 by way of which, when the control element 17 is closed, the raw gases are delivered to a rotating regenerative heat exchanger 26 by means of a blower 22, connected to the line 20, and a connecting line 24. The raw gases reach a wet-wash cleaner 30 via the connecting line 28. The cleaned gases leave the wet-wash cleaner via a line 32 and are then divided into a main flow, continuing to flow via a connecting line 34, and a partial flow continuing to flow via a connecting line 36, these two flows being delivered separately to the rotating regenerative heat exchanger. The main flow of the cleaned gases is returned downstream of the rotating regenerative heat exchanger via the line 38 to the main gas line 13 and then is carried to the exhaust flue 15. The separately heated partial flow of cleaned gas has the task of predrying the main flow of cleaned gas and also the task of acting as a blocking gas, as explained below. It is recirculated via a line 42 from the hot side of the regenerative heat exchanger back to the cold side and is introduced, upstream of the withdrawal location, into the main flow of the cleaned gases so as to predry them by raising their temperature. A blower 44 disposed in the line 36 is used to feed the partial flow of cleaned gas and to raise its pressure.

By means of the invention, an increase in the quantity of the cleaned gas flow, caused by gases introduced into the system for predrying purposes, is avoided. Instead, a closed circuit of a partial flow of cleaned gas begins at the cold side of the rotating heat exchanger, passing through the heat exchanger and returning in the bypass to its cold side. In this manner, the production of pulsations associated with an open-circuit type of circulation is also effectively counteracted.

Since the cleaned gases used for predrying have already been treated in the wet-wash cleaner, a reintroduction of sulfur compounds into the main flow of cleaned gas from the partial flow of cleaned gas is precluded. Furthermore, however, the cleaned gases directed through a separate sector of the heat exchanger in a partial flow of cleaned gas for the sake of heating and predrying the cleaned gases also take on the task of blocking gases between the raw gas sector and the cleaned gas sector and prevent the formation of a leakage and reintroduction flow out of the raw gas duct and into the cleaned gas duct of the rotating regenerative heat exchanger. It is advantageous that the blower 44 provided for raising the pressure of the partial flow of cleaned gas and feeding it is disposed in the line 36 which carries the as yet unheated partial flow of cleaned gas; that is, it is a "cold-operating cleaned-gas blower".

The pressure and the volumetric flow of the partial flow of cleaned gas are regulated on the one hand in accordance with the pressure of the raw gases delivered to the regenerative heat exchanger in the connecting line 24, such that the pressure of the partial flow of cleaned gas in the heat exchanger is higher than the pressure of the raw gases, and on the other hand in accordance with the temperature increase of the cleaned gases attained after the heated partial flow of the cleaned gases is recirculated into the main flow, prior to the entry into the heat exchanger, as compared with their temperature upon emerging from the wet-wash cleaner 38.

Figure 2:
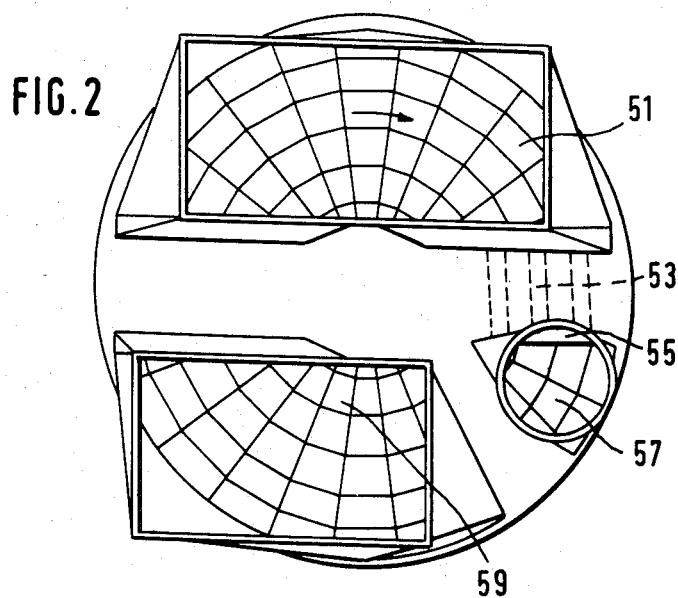
FIG. 2 is a plan view of the hot end of a regenerative heat exchanger having a rotating storage mass and stationary connection ducts used in the apparatus according to FIG. 1.

FIG. 2 is a plan view of the hot side of a regenerative heat exchanger having a rotating storage mass and stationary connecting ducts such as may be used in the system described in conjunction with FIG. 1.

Between the connecting duct 51 of the housing through which the raw gases are introduced into the storage mass and the connecting duct 59 through which the cleaned gases are carried, in a counterflow to the raw gases, out of the storage mass, there is a further connecting duct 57 of the housing, in terms of the direction of rotation of the rotating storage mass indicated by the arrow in the raw gas duct. Associated with this further connecting duct 57 of the housing, provided on the upper end of the housing, are corresponding connecting ducts on the lower, cold end, which is covered and hence not visible in the drawing. Differing from the realization of the covered, cold end of the housing, however, an apron 55 is disposed on the hot side inside the housing connecting duct 57 that carries the partial flow of cleaned gas out of the storage mass. This apron 55 communicates with lines 53 extending through the sealed sector. Control elements, not shown, are also disposed in the lines 53. By means of the apron 55 disposed on the hot side in the connecting duct 57 of the housing and by means of the adjoining lines 53, raw gases introduced with the rotating storage mass as a chamber charge into this duct are diverted into the raw gas flow by means of a portion of the partial flow of cleaned gas entering the storage mass from the cold side.

The storage mass is divided by means of this orientation of the housing connection pieces and the sealed sectors disposed between them, in connection with associated seals, into ducts for three gas flows, namely the raw gas flow, the main flow of cleaned gas and the partial flow of cleaned gas. The partial flow of cleaned gas flowing into the intervening duct simultaneously serves as a gas flow for predrying the cleaned gases before their entry into the heat exchanger, to which end this partial flow, after being heated inside the storage mass, is then returned in the bypass to upstream of the cold side of the regenerative heat exchanger and there reintroduced into the main flow of cleaned gas.

Figure 3:
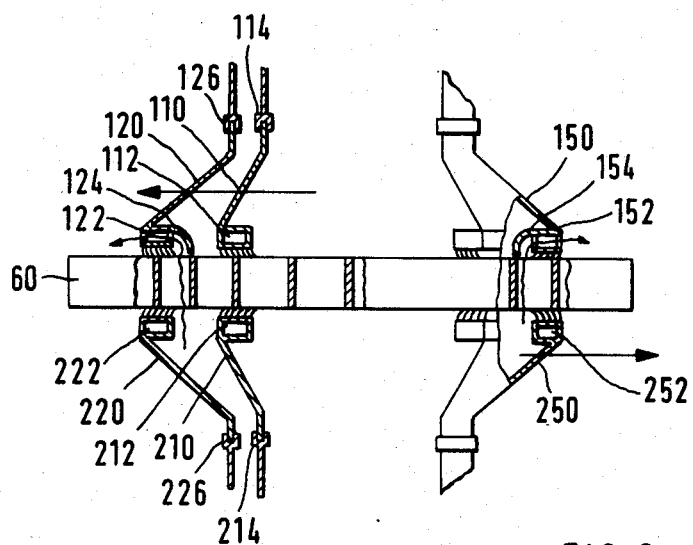
FIG. 3 is a sectional view of a regenerative heat exchanger which may alternatively be used, having a stationary storage mass and rotating connection ducts.

In FIG. 3, another embodiment of the regenerative heat exchanger is shown schematically, in which in a kinematic reversal of the conditions shown in FIG. 2 the storage mass is stationary, while the connecting ducts for the heat-exchanging media, that is, the raw and cleaned gases, rotate.

For the embodiment shown, it is a precondition that on both sides of the stationary storage mass 60, hoods carrying cleaned gases are rotated inside fixed housing connection ducts (not shown) for the raw gases. The hoods carrying the cleaned gases are embodied as double-vaned upper and lower hoods.

In the drawing, respective vertical sections are taken through the front vane of the hood as seen in the drawing. As a result, the middle duct of the front hood vane, enclosed by the hood walls 110, 210 and during its rotation carrying the main flow of the cleaned gases, is shown in section. Also shown in section the corresponding duct, preceding it as indicated by the leftward-pointing arrow, for the partial flow of the cleaned gases of the upper and lower front hood vane, as a sector between the hood walls 110, 210 and hood walls 120, 220 preceding them. In the right half of the drawing, the sectors for the partial flow of cleaned gas, which precede the rear hood vanes in the rotational direction, in accordance with the arrow pointing to the right, are shown partially cut away. Associated with the walls 110 of the upper front hood vane and the walls 210 of the lower front hood vane are sealing sectors 112, 212, and associated with the walls 120, 210 of the sectors preceding them for the partial flow of cleaned gas are sealing sectors 122, 222. In a corresponding manner, similar sealing sectors 152, 252 are shown for the walls 150, 250 of the sectors for the partial flow of cleaned gas which precede the respective rear and front hood vanes in the direction of rotation. All these sealing sectors are connected with seals on the side of the storage mass, in order compensate for the spherical deformation of the storage mass carrier under the strains of operation; in the illustrated instance, the seals are shown as sealing strips which slide on the end faces of the storage mass.

An apron 124 precedes the sealing sector 122, communicating with the hood wall 120, of the sector for the partial flow of cleaned gas preceding the top front hood vane, and an apron 154 precedes the sealing sector 152, communicating with the hood wall 150, of the sector for the partial flow of cleaned gas preceding the top rear hood vane. In accordance with the arrows winding vertically from bottom to top inside the sectors of the partial flow of cleaned gas, portions of cleaned gas diverted by the aprons 124, 154 via connections (not shown) with control elements in the sealing sectors 122, 152 upon the rotation of the hood vanes, are returned into the raw gases and introduced as a gas charge inside the entering sectors of the storage mass and carried back into the raw gas duct at both sides of the hood vanes. In the vicinity of the neck cross section of the pair of hood vanes, gas seals 114, 214 shown in cup-shaped form serve to transfer the main flow of cleaned gas to and from housing connection ducts disposed in a centrally fixed manner. Gas seals 126, 226 of the same type connect the sector of the partial flow of cleaned gas which is diametrically opposed in terms of the hood axis and precedes the various hood vanes in the rotational direction to connecting ducts which are also central and which coaxially, with an annular cross section, surround the connecting ducts of the hood vanes.

Regardless of whether a rotating regenerative heat exchanger having stationary connections and a rotating storage mass according to FIG. 2, or a heat exchanger of this kind having a stationary storage mass and rotating connections according to FIG. 3, is used, the partial flow of cleaned gas is used in a dual function, namely as a blocking gas flow, which prevents an overflow of raw gases into the cleaned gases emerging from the heat exchanger and thus prevents the introduction of sulfur components from the raw gases into the cleaned gases, and furthermore as a drying flow, which as a result of the heating in the heat exchanger, after being recirculated into the main flow of cleaned gas flowing toward the heat exchanger, raises the temperature of the cleaned gases and thereby reduces their relative humidity to such an extent that the precipitation of harmful coatings out of the cleaned gases which become firmly baked onto the storage mass is prevented.

I claim:

1. A method for reheating of cleaned gases subsequent to the wet cleaning of raw gases by means of heat exchange between said raw and cleaned gases in a regenerative heat exchanger, comprising the steps of:
    prior to the regenerative reheating of the cleaned gases by means of heat energy withdrawn from the raw gases, diverting from the previously wet-cleaned total flow of cleaned gases a partial flow of cleaned gases;
    increasing the pressure of the partial flow of cleaned gases to exceed that of the raw gases in said regenerative heat exchanger;
    heating said partial flow of cleaned gases in the regenerative heat exchanger and disposing the partial flow of cleaned gases therein so as to prevent an overflow of raw gases into the cleaned gases during the regenerative heat exchange step; and
    adding the reheated partial flow of cleaned gases to the total flow of cleaned gases upstream of the regenerative heat exchanger.

2. A method according to claim 1, characterized in that the pressure of the partial flow diverted from the main flow of the cleaned gases is regulated in accordance with the pressure of the raw gases prior to their regenerative heat exchange with the cleaned gases.

3. Apparatus for reheating of cleaned gases by means of a regenerative heat exchanger subsequent to the wet cleaning of raw gases in a wet-wash cleaner, comprising:
- a first flow-through duct in the regenerative heat exchanger for the raw gases;
- a second flow-through duct in the regenerative heat exchanger for the cleaned gases emerging from the wet-wash cleaner;
- a third flow-through duct in the regenerative heat exchanger following the raw gas duct and prior to the cleaned gas duct as viewed in the direction of the rotation of the regenerative heat exchanger, said third duct being for a partial flow of the cleaned gases, the inlet and the outlet of the third flow-through duct being connected to a line through which the cleaned gases emerging from the wet-wash cleaner flow to the heat exchanger; and
- means for increasing the pressure of the partial flow of the clean gases before it enters said regenerative heat exchanger to a level exceeding the pressure of raw gases in the regenerative heat exchanger.

4. An apparatus according to claim 3, characterized in that on the hot side of the rotating regenerative heat exchanger (26), between the flow-through duct (57) for the partial flow of cleaned gas and the raw gas duct (51), a connection (53; 55) is provided for recirculating raw gases introduced from the raw gas duct (51) into the flow-through duct (57) for the partial flow of cleaned gas.

5. An apparatus according to claim 4, characterized by control elements in the connection (53) between the ducts (51; 57) for the raw gases and the partial flow of cleaned gas, for adjusting the volumetric flow of introduced raw gases to be recirculated into the raw gas duct and of cleaned gases following these raw gases.

* * * * *